C. JARVIS.
Hand-Plow.
No. 45,831.  Patented Jan. 10. 1865.
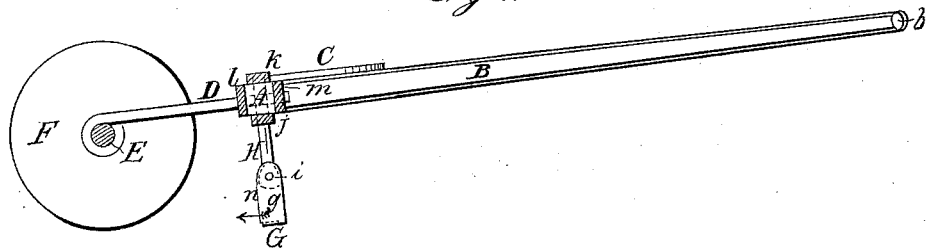
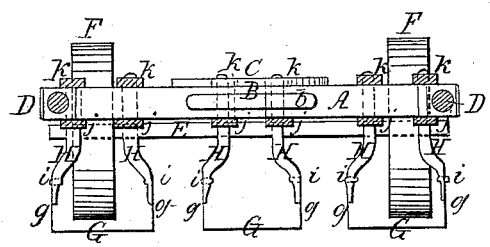
Witnesses:
Inventor:
Charles Jarvis

UNITED STATES PATENT OFFICE.

CHARLES JARVIS, OF ELLSWORTH, MAINE.

ROOT-CULTIVATOR AND WEEDER.

Specification forming part of Letters Patent No. 45,831, dated January 10, 1865.

*To all whom it may concern:*

Be it known that I, CHARLES JARVIS, of Ellsworth, in the county of Hancock and State of Maine, have invented a new and useful Root-Cultivator and Weeder; and I do hereby declare that the following is a full, clear, and exact description of the construction and operation of the same, reference being had to the accompanying drawings, forming a part of this specification, in which—

Figure 1 is a side elevation, and Fig. 2 a front elevation.

Like parts are indicated by the same letters in both figures.

My invention is more particularly designed for the cultivation of root-crops—such as carrots, beets, parsnips, &c.—either in the field for the use of stock, or in extensive vegetable gardens for culinary purposes, the great objection to the raising of which crops has hitherto consisted in the expense of weeding and thinning out the plants when sowed in drills by the seed-sowers now in general use. This objection I obviate by sowing the seed broadcast and then cutting it out into rows or hills by means of my machine, whereby I effect a saving of more than four-fifths of the labor usually expended on said crops from the sowing of the seed to the harvesting, a boy of sixteen being able with my invention to go over an acre per day, pulverize the ground, destroy the weeds, and thin out the plants more effectually than could be done by five men by any of the methods of cultivating now in general use. Again, seed sown broadcast will be spread more evenly than when sown in drills, whether by hand or machine, and thus the labor of thinning out the plants in the rows will be in a great measure saved, and no more seed per acre will be required in the one case than the other. After the seed has been sown and a crust has formed on the ground the latter may be broken up and pulverized by my machine without disturbing the seeds in the hill or row, and thus by the admission of air promote their vegetation and growth.

To enable others skilled in the art to make and use my invention, I will now proceed to describe its construction and operation. The size and proportions of the machine may of course be varied at pleasure. I will, however, describe a machine the size and proportions of which I consider as best adapted for general use.

A is a horizontal bar, of wood or metal, about thirty inches (more or less) in length, and of suitable strength.

B is the tongue, about five feet in length and attached to the center of the bar A, as shown in the drawings, C being a semicircular brace attached to the bar and tongue to steady the latter.

$b$ is a handle, attached to the extremity of the tongue, by means of which the operator draws or pushes the machine along.

F F are wheels, about fifteen inches in diameter, fast to an axle, E.

D D are arms passing through the bar A, as shown in the drawings, being confined by means of the screw-nuts $l$ and $m$. In the outer extremities of these arms turn the ends of the axle E.

H H H H H are the cutter shanks or handles, constructed of iron and shaped substantially as shown in Fig. 2, their upper ends passing through the bar A, as represented by the dotted lines, being confined at the top and bottom of the bar and rendered vertically adjustable by means of the screw-nuts $j$ and $k$.

G G G are the horizontal cutters, constructed of hardened steel, about seven inches long and beveled on their upper sides to an edge, as shown by the dotted line in Fig. 1, so as to cut whether the machine be driven forward or backward. These cutters are supported each by two sides, $g$ $g$, of the same material as the cutters, about four inches in height, and confined to the lower ends of the shanks H by means of the rivets $i$ or their equivalents. The front edges, $n$, of these sides $g$ $g$ are sharpened in the same manner as the edges of the cutters G, so that in passing through the ground they will make a smooth clean cut. The front edges, $n$, also project half an inch or so beyond the cutter G, as shown in Fig. 1, to sever the ground in advance of said cutter as it moves in the direction of the arrow in Fig. 1, and thereby leave the sides of the rows or hills less ragged than they otherwise would be.

The operator grasping the handle $b$ in his hands pushes the machine before him, causing the cutters G to enter the ground more or less, as may be required. The machine, however, may be drawn after as well as pushed before the operator, if desired; or it may be used as a "scuffle" for cutting up weeds in paths or elsewhere, as well as for the cultivation of roots. Before the seeds are above ground, or as soon as the weeds appear on the cultivated land, the machine is passed over it first in one direction and then crossed at right angles, forming hills three inches square with spaces of seven inches between them; or, if desirable, the machine may be passed over the land only in one direction, in which latter case the root-plants will be left in continuous rows. In either case the weeds and plants between the rows or hills will be exterminated.

The machine is very simple, cheap, light, and easily kept in working order.

Having thus described the construction and operation of my invention, what I claim as new, and desire to secure by Letters Patent, is—

1. Constructing the front edges, $n$, of the sides $g\ g$ of the cutters G so as to project beyond the latter, substantially as and for the purpose described.

2. The cutters G, arranged as described, in combination with the bar A, tongue B, and wheels F, substantially as and for the purpose specified.

CHARLES JARVIS.

Witnesses:
A. F. DRINKWATER,
GEO. W. NEWBEGIN.